(12) United States Patent
Stehle

(10) Patent No.: US 9,702,235 B2
(45) Date of Patent: Jul. 11, 2017

(54) METHOD OF IMPROVING MINERAL OIL PRODUCTION BY HEATING THE FORMATION AND FORMING GEL

(75) Inventor: Vladimir Stehle, Kassel (DE)

(73) Assignee: Wintershall Holding GmbH, Kassel (DE)

( * ) Notice: Subject to any disclaimer, the term of this patent is extended or adjusted under 35 U.S.C. 154(b) by 975 days.

(21) Appl. No.: 13/588,603

(22) Filed: Aug. 17, 2012

(65) Prior Publication Data

US 2013/0043024 A1    Feb. 21, 2013

Related U.S. Application Data

(60) Provisional application No. 61/524,337, filed on Aug. 17, 2011.

(51) Int. Cl.
| | |
|---|---|
| *E21B 43/24* | (2006.01) |
| *E21B 43/12* | (2006.01) |
| *E21B 43/20* | (2006.01) |
| *C09K 8/592* | (2006.01) |

(52) U.S. Cl.
CPC ............. *E21B 43/24* (2013.01); *C09K 8/592* (2013.01); *E21B 43/12* (2013.01); *E21B 43/20* (2013.01)

(58) Field of Classification Search
CPC ............ E21B 43/22; E21B 43/20; C09K 8/58
USPC .................. 166/400, 272.3, 272.5, 275, 285
See application file for complete search history.

(56) References Cited

U.S. PATENT DOCUMENTS

| | | | | |
|---|---|---|---|---|
| 3,614,985 A | * | 10/1971 | Richardson | 166/294 |
| 3,815,681 A | * | 6/1974 | Richardson | 166/281 |
| 4,141,416 A | * | 2/1979 | Holm | 166/270.1 |
| 4,300,634 A | | 11/1981 | Clampitt | |
| 4,485,875 A | * | 12/1984 | Falk | 166/295 |
| 4,940,091 A | * | 7/1990 | Shu et al. | 166/270 |
| 2008/0035344 A1 | | 2/2008 | Odeh et al. | |
| 2011/0088899 A1 | * | 4/2011 | Stehle et al. | 166/270 |
| 2012/0080187 A1 | | 4/2012 | Stehle | |
| 2012/0138302 A1 | | 6/2012 | Stehle | |
| 2012/0199343 A1 | | 8/2012 | Stehle | |
| 2012/0255729 A1 | | 10/2012 | Stehle | |

FOREIGN PATENT DOCUMENTS

| | | |
|---|---|---|
| RU | 2 338 768 C1 | 11/2008 |
| RU | 2 339 803 C2 | 11/2008 |
| RU | 2 361 074 C2 | 7/2009 |

OTHER PUBLICATIONS

U.S. Appl. No. 61/499,710, filed Aug. 22, 2012, Stehle, Vladimir.

(Continued)

*Primary Examiner* — Silvana Runyan
(74) *Attorney, Agent, or Firm* — Drinker Biddle & Reath LLP

(57) ABSTRACT

A process for producing mineral oil from mineral oil deposits, in which the mineral oil yield is increased by blocking high-permeability regions of the mineral oil formation by injecting at least one formulation into the deposit, the formulation not being brought to a temperature at which the viscosity increases significantly until within the deposit, by injection of steam. The process can be used especially in the final stage of deposit development between water flooding and steam flooding of the deposits.

19 Claims, 5 Drawing Sheets

(56) References Cited

OTHER PUBLICATIONS

Figure 1:
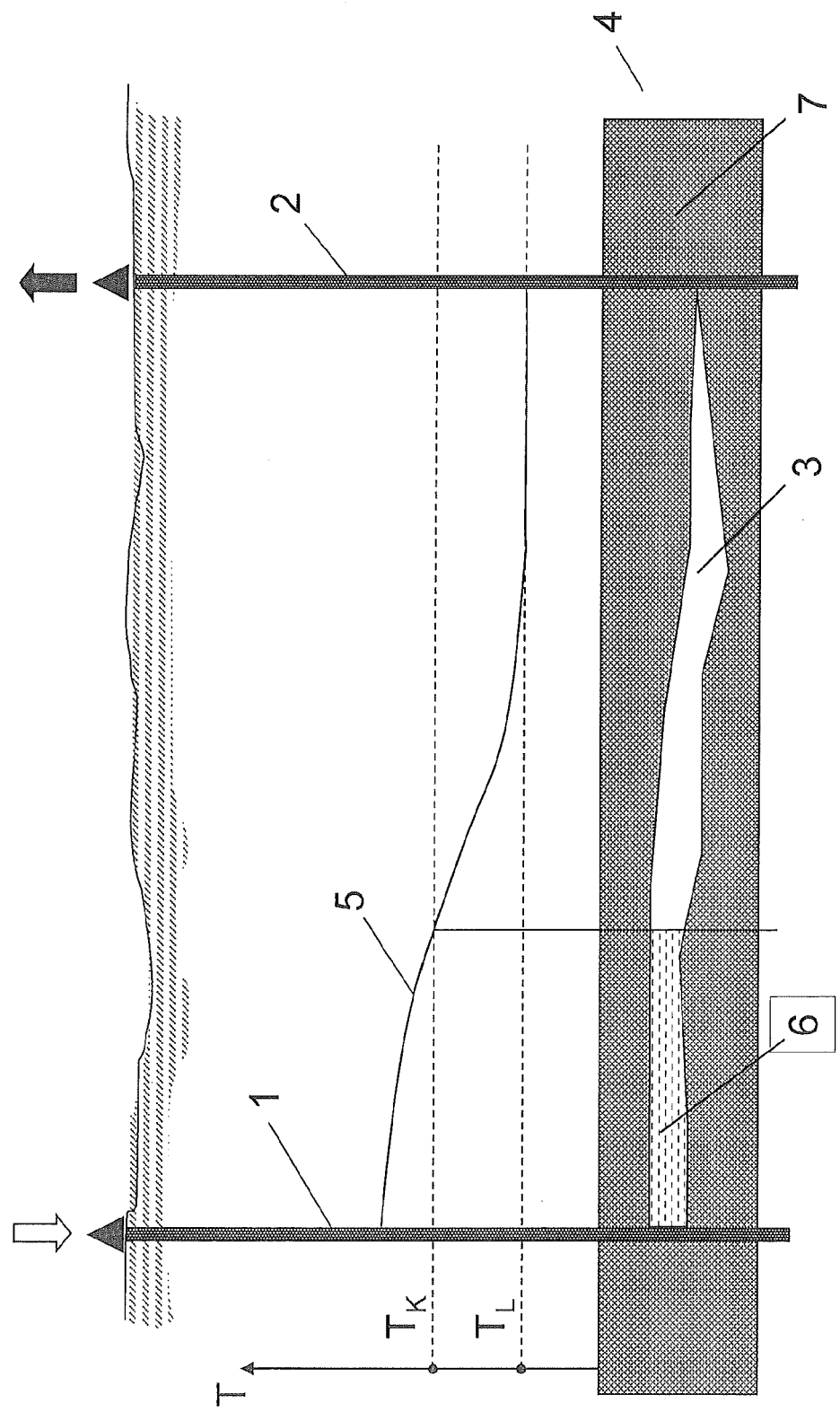

Altunina, L.K., et al., "Improved Oil Recovery of High-Viscosity Oil Pools with Physicochemical Methods and Thermal-Steam Treatments", Oil & Gas Science and Technology—Rev. IFP, vol. 63, No. 1 (2008), pp. 37-48.

Borling, Daniel, et al., "Pushing Out the Oil with Conformance Control", Oilfield Review (1994), pp. 44-58.

\* cited by examiner

METHOD OF IMPROVING MINERAL OIL PRODUCTION BY HEATING THE FORMATION AND FORMING GEL

CROSS-REFERENCE TO RELATED APPLICATIONS

This application claims the benefit of U.S. Provisional Application 61/524,337, filed Aug. 17, 2011, which is incorporated herein by reference.

This patent application claims the benefit of U.S. provisional patent application Ser. No. 61/524,337 filed on Aug. 17, 2011, incorporated in its entirety herein by reference.

The present invention relates to a process for producing mineral oil from mineral oil deposits, in which the mineral oil yield is increased by blocking high-permeability regions of the mineral oil formation by injecting at least one formulation into the deposit, the formulation not being brought to a temperature at which the viscosity increases significantly until within the deposit, by injection of steam. The process can be used especially in the final stage of deposit development between water flooding and steam flooding of the deposits.

In natural mineral oil deposits, mineral oil occurs in cavities of porous reservoir rocks which are closed off from the surface of the earth by impervious overlying strata. In addition to mineral oil, including proportions of natural gas, a deposit further comprises water with a higher or lower salt content. The cavities may be very fine cavities, capillaries, pores or the like, for example those having a diameter of only approx. 1 µm; the formation may additionally also have regions with pores of greater diameter and/or natural fractures, however. In a mineral oil deposit, one or more oil-bearing strata may be present.

After the well has been sunk into the oil-bearing strata, the oil at first flows to the production wells owing to the natural deposit pressure, and erupts from the surface of the earth. This phase of mineral oil production is referred to by the person skilled in the art as primary production. In the case of poor deposit conditions, for example a high oil viscosity, rapidly declining deposit pressure or high flow resistances in the oil-bearing strata, eruptive production rapidly ceases. With primary production, it is possible on average to produce only 2 to 10% of the oil originally present in the deposit. In the case of higher-viscosity mineral oils, eruptive production is generally completely impossible.

In order to enhance the yield, what are known as secondary production processes are therefore used.

The most commonly used process in secondary mineral oil production is water flooding. This involves injecting water through injection wells into the oil-bearing strata. This artificially increases the deposit pressure and forces the oil out of the injection wells to the production wells. By water flooding, it is possible to substantially increase the yield level under particular conditions.

In the ideal case of water flooding, a water front proceeding from the injection well should force the oil homogeneously over the entire mineral oil formation to the production well. In practice, a mineral oil formation, however, has regions with different levels of flow resistance. In addition to oil-saturated reservoir rocks which have fine porosity and a high flow resistance for water, there also exist regions with low flow resistance for water, for example natural or synthetic fractures or very permeable regions in the reservoir rock. Such permeable regions may also be regions from which oil has already been recovered. In the course of water flooding, the flooding water injected naturally flows principally through flow paths with low flow resistance from the injection well to the production well. The consequences of this are that the oil-saturated deposit regions with fine porosity and high flow resistance are no longer flooded, and that increasingly more water and less mineral oil is produced via the production well. In this context, the person skilled in the art refers to "watering out of production". The effects mentioned are particularly marked in the case of heavy or viscous mineral oils. The higher the mineral oil viscosity, the more probable is rapid watering out of production.

For production of mineral oil from deposits with high mineral oil viscosity, the mineral oil can also be heated by injecting steam in the deposit, thus reducing the oil viscosity. As in the case of water flooding, however, steam and steam condensate can also strike undesirably rapidly through high-permeability zones from the injection wells to the production wells, as a result of which the efficiency of the tertiary production is reduced.

It is customary at present to conduct both steps when developing deposits containing viscous oil: water flooding followed by steam flooding. The blocking of the high-permeability channels during steam flooding is technologically difficult to accomplish due to the very high temperatures in the environment of the injection well.

The prior art discloses measures for closing such high-permeability zones between injection wells and production wells by means of suitable measures. As a result of these, high-permeability zones with low flow resistance are blocked and the flooding water or the flooding steam flows again through the oil-saturated, low-permeability strata. Such measures are also known as "conformance control". An overview of measures for conformance control is given by Borling et al. "Pushing out the oil with Conformance Control" in Oilfield Review (1994), pages 44 ff.

For conformance control, it is possible to use comparatively low-viscosity formulations of particular chemical substances which can be injected easily into the formation, and the viscosity of which rises significantly only after injection into the formation under the conditions which exist in the formation. To enhance the viscosity, such formulations comprise suitable inorganic, organic or polymeric components. The rise in viscosity of the injected formulation can firstly occur with a simple time delay. However, there are also known formulations in which the rise in viscosity is triggered essentially by the temperature rise when the injected formulation is gradually heated to the deposit temperature in the deposit. Formulations whose viscosity rises only under formation conditions are known, for example, as "thermogels" or "delayed gelling systems". However, these formulations can be employed efficiently only for deposits whose temperature is above 60° C.

SU 1 654 554 A1 discloses processes for producing oil, in which mixtures comprising aluminum chloride or aluminum nitrate, urea and water are injected into the mineral oil formations. At the elevated temperatures in the formation, the urea is hydrolyzed to carbon dioxide and ammonia. The ammonia which forms significantly increases the pH of the water, as a result of which high-viscosity aluminum hydroxide gel precipitates out, which blocks the high-permeability regions.

US 2008/0035344 A1 discloses a mixture for blocking underground formations with delayed gelation, which comprises at least one acid-soluble crosslinkable polymer, for example partly hydrolyzed polyacrylamide, a partly neutralized aluminum salt, for example an aluminum hydroxide chloride, and an activator which can release bases under formation conditions, for example urea, substituted ureas or hexamethylenetetramine. The mixture is preferably used at a temperature of 0 to 40° C., and gelates at temperatures above 50° C., according to the use conditions, within 2 h to 10 days.

RU 2 339 803 C2 describes a process for blocking high-permeability regions in mineral oil deposits, in which the volume of the high-permeability region to be blocked is first of all determined. Subsequently, an aqueous formulation comprising carboxymethylcellulose and chromium acetate as a crosslinker is injected into the region to be blocked, the volume of the injected mixture being 15%, based on the total volume of the region to be blocked. In the next step, an aqueous formulation comprising polyacrylamide and a crosslinker is injected.

RU 2 361 074 describes a process for blocking high-permeability regions in mineral oil deposits with high deposit temperature, in which formulations based on urea and aluminum salts are injected portionwise.

L. K. Altunina and V. A. Kushinov, Oil & Gas Science and Technology—Rev. IFP, Vol. 63 (2008), pages 37 to 48 describe various thermogels and the use thereof for oil production, including thermogels based on urea and aluminum salt, and thermogels based on cellulose ethers.

U.S. Pat. No. 4,141,416 discloses a process for tertiary mineral oil production, in which an aqueous alkaline silicate solution is injected into a mineral oil formation to lower the water-oil interfacial tension, thus reducing the interfacial tension. In one variant, it is possible simultaneously to close permeable regions of the mineral oil formation, by, in a second step, additionally injecting components such as acids which can form precipitates with the alkaline silicate solution.

U.S. Pat. No. 4,300,634 describes a process for blocking highly permeable regions by means of foams. For this purpose, a foamable gel comprising water, a surfactant, a gel former, an aldehyde and a phenol compound is used. The gel is produced above ground in a tank by mixing the components and then pumped into the mineral oil deposit. The gel former prevents foam formation in the course of pumping. Subsequently, steam is injected into the mineral oil deposit in order to thermally decompose the gel former. The thermal decomposition of the gel former rapidly reduces the viscosity of the gel, such that it is possible to form a foam in which water forms the outer phase and steam the gas phase.

A disadvantage of the gel described in U.S. Pat. No. 4,300,634 is that it only gets into the zones close to the injection well due to its high viscosity. A further disadvantage is that foams are relatively unstable and can collapse into themselves, such that the process described in U.S. Pat. No. 4,300,634 achieves only time-limited blockage of highly permeable zones in the mineral oil deposit.

For formation of stable foams, a rest period normally has to be inserted after the foam formation. In the process of U.S. Pat. No. 4,300,634, the foam is formed simultaneously with the hydrodynamic action of the flood wave on the injected gel. The hydrodynamic action is particularly strong especially in the zones close to the borehole, such that the foams are severely damaged especially in the zones close to the borehole.

RU 2 338 768 C1 describes a process for blocking permeable regions in mineral oil deposits, in which a solution comprising sodium phosphate, sodium oxalate, sodium carbonate and a mixture of carboxymethylcellulose and xanthan, and a second solution comprising calcium chloride, copper chloride and aluminum chloride, are each injected separately into the mineral oil formation, and the two formulations mix underground. In order to prevent premature mixing, it is also possible to inject a portion of water into the mineral oil formation between the two formulations. After mixing, the formulations form precipitates of sparingly soluble hydroxides and calcium salts.

The time that the above-described gel-forming formulations require for formation thereof depends not only on the composition and the concentration of the components but of course on the temperature, and the higher the temperature, the more rapidly gel is formed. While gel formation at temperatures of 50-120° C. can take hours, days or even weeks, gel is of course formed considerably more rapidly at higher temperatures.

For instance, according to L. K. Altunina and V. A. Kushinov, Oil & Gas Science and Technology—Rev. IFP, Vol. 63 (2008), pages 37 to 48, gel formation of a gel-forming formulation comprising aluminum salts and urea sets in after 40 min at 150° C., after 20 min at 200° C., and after 10 min at 250° C. When such formulations are injected into a hot injection well or a hot formation, there is a high risk that gel formation will set in already in the immediate zone close by the injection well, since the flow rate of the formulation in the mineral oil formation is usually so low that the formulations are heated up very rapidly after the injection.

Thus, the injected formulations completely fail to reach the high-permeability regions that they are actually supposed to block, and the viscous gels are instead already formed at the injection well or in the zone close to the borehole. The high-permeability regions in the deposit may, however, extend for several hundreds of meters. In the case of use of the above-described thermogel formulations, only the permeability of the zone close to the borehole is thus reduced.

It is customary at present to conduct the development of deposits containing viscous oil (>30 cP) with the following steps: water flooding followed by steam flooding. As described above, the blocking of the high-permeability channels during steam flooding is technologically difficult to accomplish due to the very high temperatures in the environment of the injection well.

It was therefore an object of the present invention to provide a process for producing mineral oil from mineral oil formations, in which watering out of production is reduced, the level of oil recovery is controlled and the high-permeability channels in the mineral oil formation are reliably blocked during steam flooding.

This object is achieved by the following process for producing mineral oil from an underground mineral oil deposit into which at least one injection well and at least one production well have been sunk, comprising the following process steps:

(1) injecting at least one aqueous formulation F which exhibits an increase in viscosity at or above a critical temperature $T_K$ through the at least one injection well into the at least one oil-bearing stratum L, the critical temperature $T_K$ being above the temperature $T_L$ of the at least one oil-bearing stratum L, (2) directly and/or indirectly heating at least a portion of the aqueous formulation F injected in step (1) by injecting steam into the mineral oil deposit, (3) producing mineral oil through at least one production well, the temperature of the aqueous formulation F on injection in step (1) being below the critical temperature $T_K$ thereof, and step (2) being conducted at least until at least a portion of the aqueous formulation F injected in step (1) has been heated to a temperature of at least $T_K$.

In a preferred embodiment, the temperature $T_L$ of the oil-bearing stratum in step (1) is 8 to 60° C.

The process according to the invention has the advantage that deep penetration of the formulation into the high-permeability zones, even in deposits with low temperature, allows the profile modification of the flooding to be achieved in an efficient manner. The process enables blockage even of cooled (for example by water flooding) washed-out rock zones in the deposit. The distance between the borehole and the site at which blocking is to be effected can be regulated in the process according to the invention. This achieves efficient blocking of high-permeability zones, reduces watering out of production and increases the level of oil recovery.

The process according to the invention is especially suitable for use in the development of deposits containing viscous mineral oil after completion of water flooding and before commencement of steam flooding, since the formulation can be pumped deep into the high-permeability channels in the deposit cooled by water flooding, and only thereafter are these channels blocked in the course of steam flooding as a result of the temperature-induced rise in viscosity.

INDEX OF FIGURES

FIG. 1 schematic illustration of the temperature profile between the injection well and production wells in a mineral oil deposit during steam flooding (vertical section)

Figure 2:
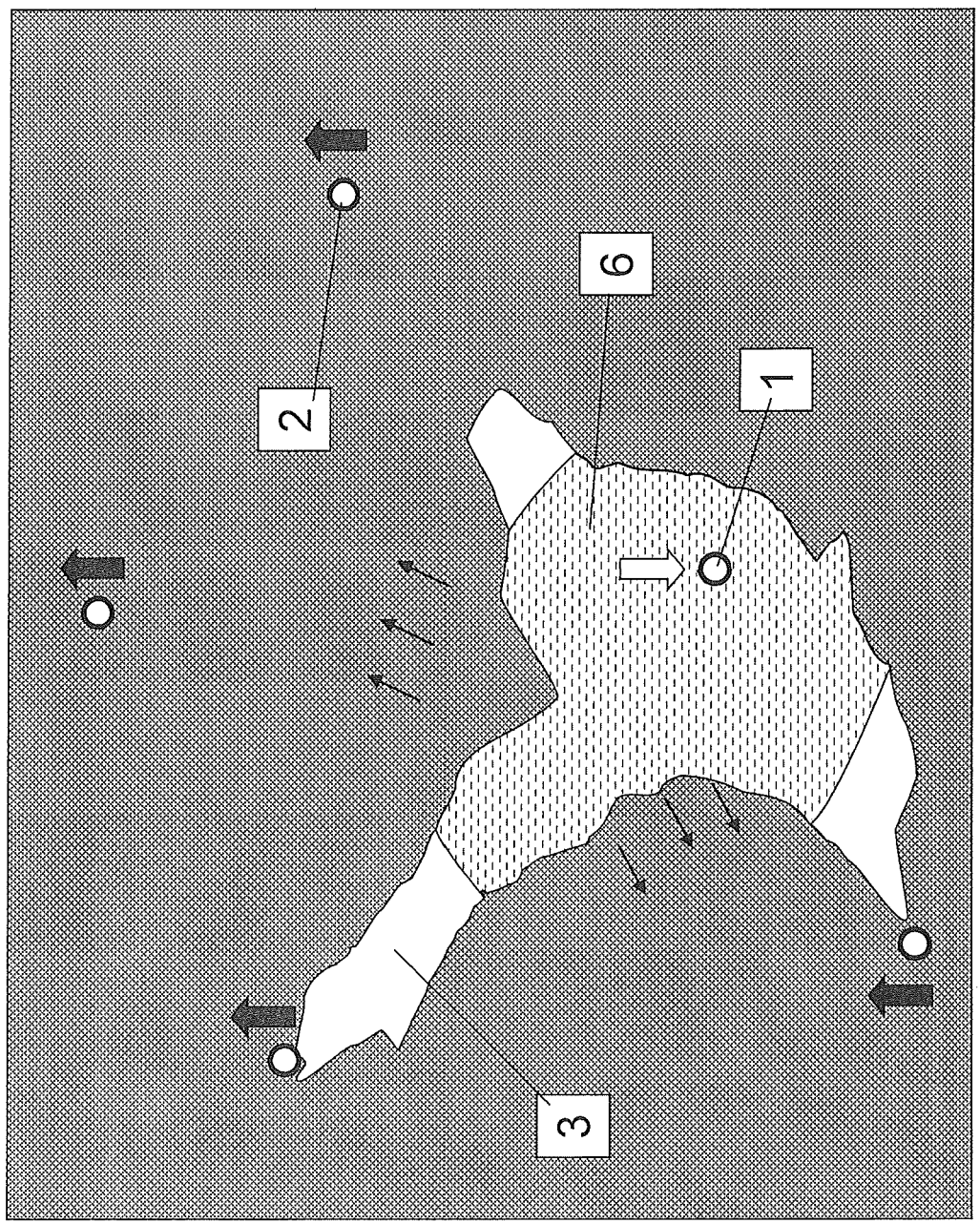

FIG. 2 schematic illustration of the gelated zone in the deposit (horizontal section)

Figure 3:
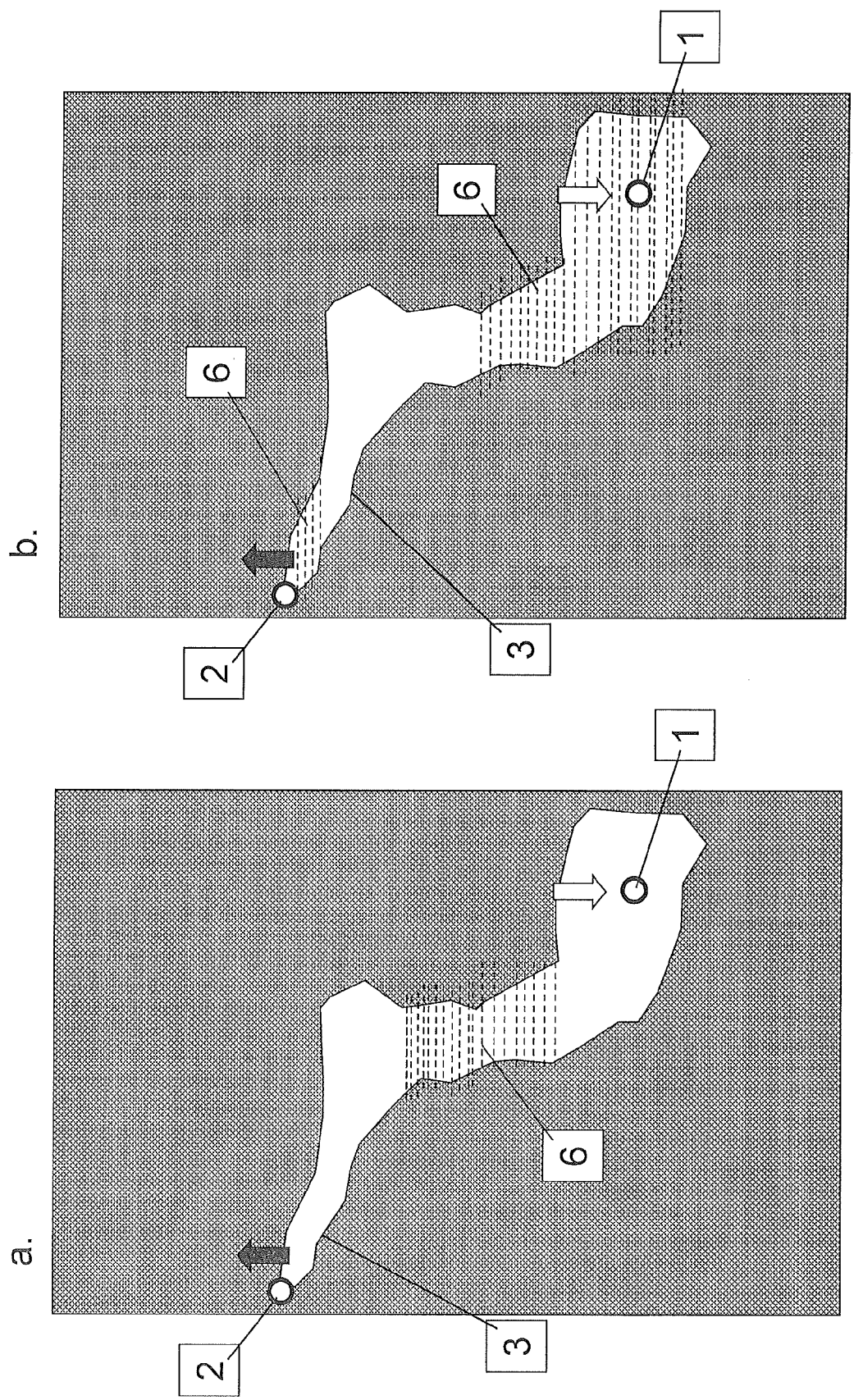

FIGS. 3a and b schematic illustration of the gelated zone (two variants) in the deposit between two wells (horizontal section)

Figure 4:
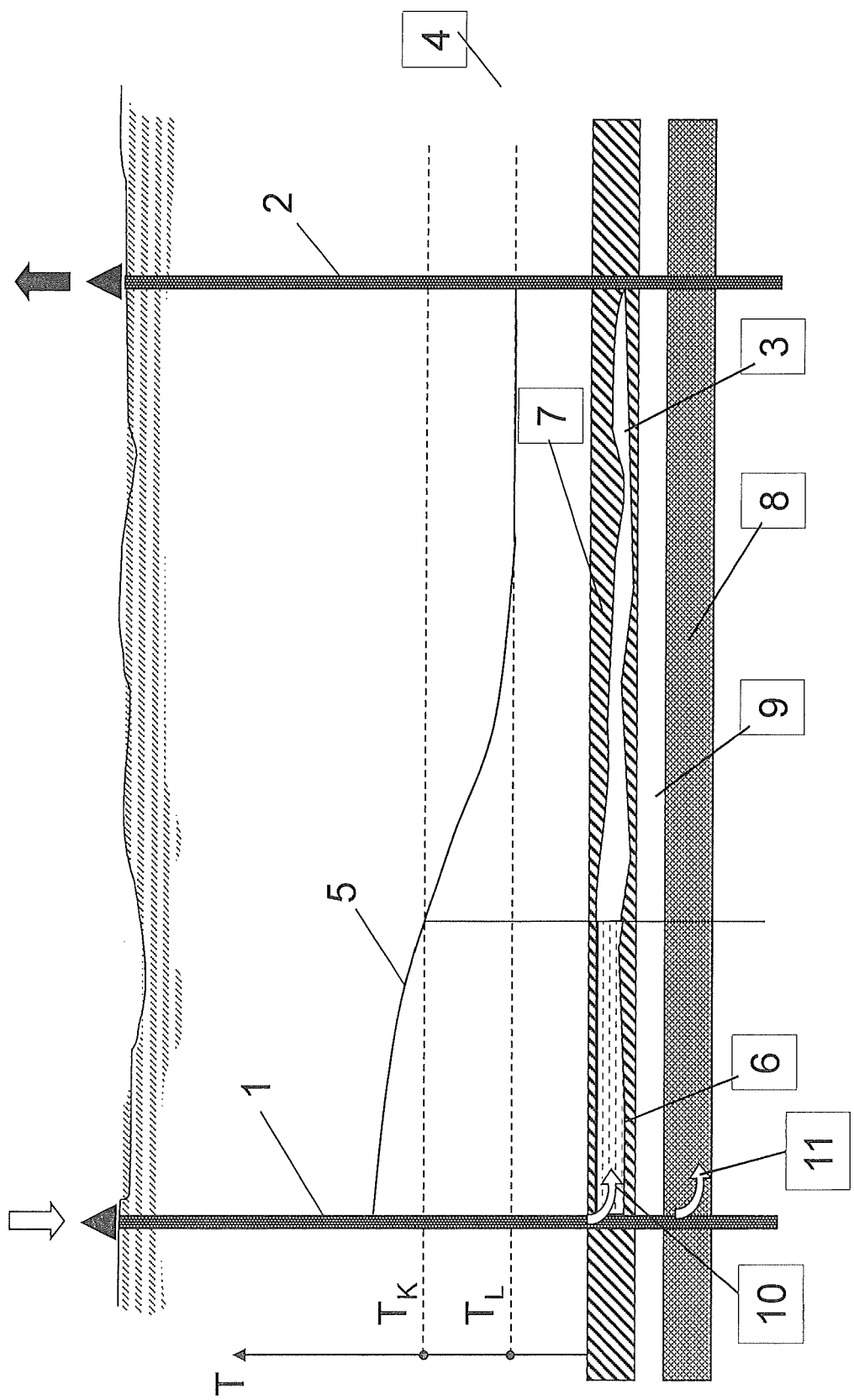

FIG. 4 schematic illustration of the temperature profile between the injection well and production wells in a mineral oil deposit during indirect heating of the stratum flooded with formulation F (vertical section)

Figure 5:
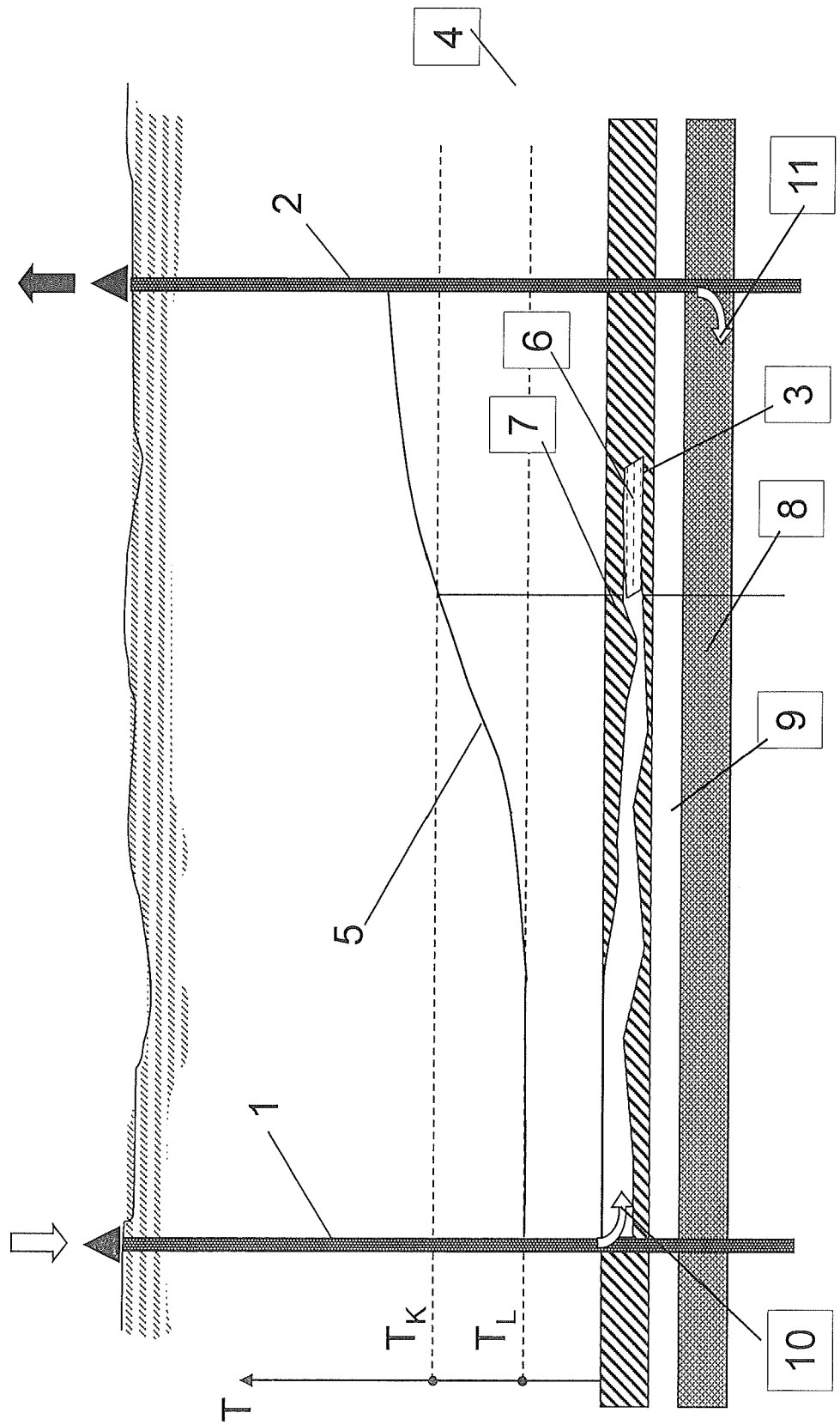

FIG. 5 the same as in FIG. 4, except that the formulation F and the heat carrier are injected through different wells.

REFERENCE NUMERALS

1: injection well
2: production well
3 high-permeability zone/region
4: deposit
5: temperature profile
6: formulation F in which the viscosity is increased ("gel bank")
7: oil-bearing stratum L
8: stratum B
9: non-oil-bearing intermediate stratum
10: formulation F
11: steam With regard to the invention, the following specific details can be given:

The process according to the invention for production of mineral oil is a process for secondary or tertiary mineral oil production, which means that it is employed after primary mineral oil production due to the autogenous pressure of the deposit having stopped and the pressure in the deposit has to be maintained by injecting water and/or steam. In the process, high-permeability regions in a mineral oil-bearing stratum are blocked.

DEPOSITS

The deposits may be deposits for all kinds of oil, for example those for light or heavy oil. In one embodiment of the invention, the deposits are heavy oil deposits, i.e. deposits which comprise mineral oil with an API gravity of 15 to 25° API. The oil present in the mineral oil deposit preferably has a viscosity of at least 30 cP, more preferably of at least 50 cP, measured at the temperature $T_L$ of the mineral oil-bearing stratum L in question in the deposit.

To execute the process, at least one production well and at least one injection well are sunk into at least one oil-bearing stratum of the mineral oil deposit. In general, an oil-bearing stratum is provided with several injection wells and with several production wells.

PROCESS

According to the invention, the process comprises at least three process steps (1), (2), and (3), which are executed in this sequence, but not necessarily in immediate succession. The process may of course comprise further process steps which can be executed before, during or after steps (1), (2), and (3).

The process according to the invention is preferably performed after the water flooding. This means that, before process step (1), water or else aqueous solution is injected into the at least one injection well, and mineral oil is withdrawn through at least one production well. "Aqueous solution" is understood in this case to mean mixtures which consist predominantly of water and one or more additives, such as water thickeners or surfactants. The term "mineral oil" in this context does not of course mean single-phase oil, but rather the customary emulsions which comprise oil and formation water and are produced from mineral oil deposits.

The water injected or the aqueous formulation typically has a natural temperature of 0 to 60° C., preferably of 5 to 30° C. The water temperature depends on the season and on the geographical location of the production region. If the deposit is warm and deposit water is used for water flooding, the temperature of the flooding water also rises.

The injection of water or aqueous solution results in formation, in the region between the injection well and the production well, of a zone in which oil is displaced by water.

The injection of water or aqueous solution allows the original deposit temperature to be altered, which means that it can be increased or decreased according to whether the water injected or the aqueous solution has a higher or lower temperature than the original temperature of the deposit.

The injection of water or aqueous solution increases the pressure in the deposit, and results in formation, in the region between the injection well and the production well, of zones ((3), see FIGS. 1 to 5) in which oil is displaced by water or aqueous solution. These zones (3) are characterized by high or relatively high permeabilities. These zones (3) are also referred to as water-bearing "channels". In these channels, the flow resistance is reduced and the water injected flows through the channels from the injection well to the production well. This significantly reduces the displacement effect of the flooding water, watering out of production rises as a result, and oil recovery from the deposit is reduced. These adverse effects are particularly marked in the case of development of deposits containing viscous oil, since viscous oil is difficult to mobilize. High-permeability zones need not, however, be produced by the water flooding, but may also be present naturally in a formation. If the flooding water used is an aqueous solution comprising water thickeners or surfactants, the adverse effects mentioned can be reduced somewhat, but the flooding water will ultimately always find the path of least flow resistance between the injection well and the production well. Therefore, in the best case, after completion of water flooding, only 10 to 40% of the mineral oil is obtained.

When watering out of production rises relatively rapidly after commencement of water flooding, this is a clear indication of water breakthrough. In the case of water breakthrough, water flows through high-permeability zones from the injection well to the production well.

Process Step (1)

Process step (1) can be employed as soon as watering out of production becomes excessive or a so-called water breakthrough is registered. Process step (1) can be performed immediately after water flooding.

To prepare for process step (1), it may be advantageous to measure the temperature in the region of the injection well and to determine the temperature range of the mineral oil-bearing stratum L in the region under the influence of flooding. Methods for determining the temperature range of a mineral oil deposit are known in principle to those skilled in the art. The temperature distribution is generally determined by temperature measurements at particular sites in the formation in combination with simulation calculations, the simulation calculations taking account of factors including amounts of heat introduced into the formation and the amounts of heat removed from the formation. Alternatively, each of the regions can also be characterized by its average temperature. It is clear to the person skilled in the art that the outlined analysis of the temperature range constitutes merely an approximation of the actual conditions in the formation.

Preferably in accordance with the invention, the mineral oil-bearing stratum L in process step (1) has a temperature of 8 to 60° C., preferably in the range from 8 to 50° C., measured at the injection well.

In the course of process step (1), in high-permeability zones of the mineral oil deposit in the region between at least one injection well and at least one production well, at least one aqueous formulation F which exhibits a viscosity increase at or above a critical temperature $T_K$ is injected through the at least one injection well into the mineral oil-bearing stratum L.

The increase in viscosity of the aqueous formulation proceeds above a critical temperature $T_K$, for example as a result of gel formation, flocculation or sedimentation.

The aqueous formulation comprises, as well as water, one or more different chemical components which, on attainment of the critical temperature $T_K$, lead to an increase in viscosity. Typically, the aqueous formulation comprises at least two different components. These may be either inorganic or organic components, or else combinations of inorganic and organic components.

Preferably in accordance with the invention, the formulation F used is a formulation which forms a gel at the temperature $T_K$ or higher.

Suitable formulations are known to those skilled in the art, for example formulations based on water-soluble polymers as in U.S. Pat. No. 4,844,168, U.S. Pat. No. 6,838,417 B2, or US 2008/0035344 A1. Formulations essentially based on inorganic components are described, for example, in SU 1 654 554 A1, U.S. Pat. No. 4,889,563, RU 2066743 C1, WO 2007/135617, U.S. Pat. No. 7,273,101 B2 or RU 2 339 803 C2. Suitable formulations are also commercially available.

In a preferred embodiment, the at least one aqueous formulation F comprises at least one compound M selected from metal compounds and semimetal compounds which can form gels when admixed with base, and at least one water-soluble activator which brings about an increase in the pH of the aqueous formulation at a temperature of at least $T_K$.

Preferably in accordance with the invention, the at least one compound M is selected from water-soluble aluminum (III) salts, colloidal Si compounds and mixtures thereof which can form gels when admixed with base. As a variant, it is also possible to use mixtures based on organic products (e.g. cellulose ethers). More preferably, the at least one compound M is selected from aluminum chloride, aluminum nitrate, aluminum acetate, aluminum acetylacetonate, aluminum sulfate, partial hydrolysates thereof, colloidal $SiO_2$ and mixtures thereof. Partial hydrolysates of aluminum salts are partially hydrolyzed aluminum salts, for example aluminum hydroxychloride. The pH of formulation F is generally ≤5, preferably ≤4.

The colloidal Si compounds are preferably colloidal $SiO_2$, which should advantageously have an average particle size of 4 nm to 300 nm. The specific surface area of the $SiO_2$ may, for example, be 100 to 300 $m^2/g$.

Useful water-soluble activators include all compounds which release bases or bind acids when heated to a particular temperature in aqueous medium, and thus ensure an increase in the pH of the solution/formulation. The water-soluble activators used may, for example, be urea, substituted urea such as N,N'-dimethylurea, hexamethylenetetramine, cyanates and mixtures thereof. Urea, for example, is hydrolyzed in aqueous medium to give ammonia and $CO_2$.

More preferably, the aqueous solution F comprises at least one compound selected from aluminum chloride, aluminum nitrate, aluminum acetate, aluminum acetylacetonate, aluminum sulfate, partial hydrolysates thereof and mixtures thereof, and at least one water-soluble activator selected from urea, substituted urea, hexamethylenetetramine, cyanates and mixtures thereof.

The increase in the pH results in formation of high-viscosity, water-insoluble gels which comprise metal ions, hydroxide ions and possibly also further components. In the case of use of aluminum compounds, aluminum hydroxide or aluminum oxide hydrate gel can form, which may of course also comprise further components, for example the anions of the aluminum salt used.

As well as water, the formulation F may optionally also comprise further water-miscible organic solvents. Examples of such solvents comprise alcohols. In general, the formulation F should comprise at least 80% by weight of water, based on the sum of all solvents in the formulation F, preferably at least 90% by weight and more preferably at least 95% by weight. Most preferably, the only solvent used is water.

The concentration of the metal compounds used is selected by the person skilled in the art such that a gel with the desired viscosity forms. For this purpose, the at least one water-soluble activator is used in such a concentration that a sufficient amount of base can form to lower the pH to such an extent that a gel can indeed precipitate out. In addition, the gel formation time $t_{Gel}$ can also be determined via the amounts or the ratios. The higher the concentration of the activator, the greater—for a given concentration of the metal compound—the rate of gel formation. This relationship can be used by the person skilled in the art to accelerate or to slow the gel formation time in a controlled manner. The rate of gel formation after the critical temperature $T_K$ has been exceeded is naturally also determined by the temperature which exists in the mineral oil deposit. In the case of aluminum salts, an amount of 0.2 to 3% by weight of aluminum (III), based on the aqueous formulation, has been found to be advantageous. The amount of the at least one water-soluble activator should at least be such that 3 mol of base are released per mole of Al(III).

For example, an inorganic mixture of 8% by weight of $AlCl_3$ (calculated as anhydrous product, this corresponds to 1.6% by weight of Al(III)), 25% by weight of urea and 67% by weight of water is used. The maximum concentrations of the components are selected with consideration of the dilution of the mixture in the geological layer, specifically 17% by weight of $AlCl_3$, 34% by weight of urea, the remainder being water. At these concentrations, even in the case of 8-fold dilution of the mixture, the formation of the gel when the temperature rises is guaranteed. In the case of injection of the formulation into the geological layer, the intensive dilution takes place predominantly at the edge of the flooded zone. This preserves the ability of the formulation to form a gel when the temperature rises. Since the above-described inorganic mixture is a true solution, sedimentation, formation of flocs or gelation in the geological layer before the temperature rises is ruled out. The inorganic aqueous solution based on urea and aluminum salt can be stored for months without any change in its properties.

The inventive formulation F is not a gel below the critical temperature $T_K$. Only at or above the critical temperature $T_K$ does the formulation F develop the properties of a gel.

A gel in relation to the formulation F is understood in the present context to mean that the formulation F after gelation under the deposit conditions has a much higher viscosity than prior to gelation, preferably in the range from 200 to 5000 cP, preferably in the range from 400 to 3000 cP and especially in the range from 500 to 2000 cP. The viscosity is measured at shear rates in the range from 0.5 to 1.5 $s^{-1}$ under the deposit conditions. The formulation F in gelated form generally has a flow limit.

In the ungelated state, the inventive formulation F is not a gel. This is understood to mean that, prior to the gelation, it has a much lower viscosity than after the gelation, preferably in the range from 5 to 100 cP, more preferably in the range from 7 to 70 cP and especially in the range from 10 to 50 cP. In the ungelated state, the formulation F generally does not have a flow limit or a flow limit which is well below that in the gelated state.

This has the advantage that the formulation F can be injected deep into highly permeable zones prior to gelation, and the highly permeable zones are effectively blocked after the gelation.

In a preferred embodiment, the first portion injected in the course of pumping of the aqueous formulation F is the formulation F with maximum possible component concentration. Thereafter, the component concentration can be reduced in stages or continuously. This guarantees the gelation of the formation F even if dilution takes place underground. If, for example, the formulation F based on urea and aluminum salt is injected with maximum component concentration, 8-fold dilution with water is allowed without impairment of the gel properties.

Tab. 1 below gives an illustration of the time until gel formation for a mixture of 8% by weight of aluminum chloride (calculated as anhydrous product, corresponds to 1.6% by weight of Al(III)), 25% by weight of urea and 67% by weight of water.

TABLE 1

| | Temperature [° C.] | | | | |
|---|---|---|---|---|---|
| | 100 | 90 | 80 | 70 | 60 |
| Gel formation time [days] | ¼ | 1 | 3 | 6 | 30 |

The formulations F may additionally comprise further components which can accelerate or slow gel formation. Examples thereof comprise further salts or naphthenic acids. In addition, the formulations F may also comprise surfactants and/or thickeners, for example thickening polymers. The thickening polymers added may, for example, be polyacrylamide, xanthan or other biopolymers based on polysaccharide. Typically, a sufficient amount of thickener is added to the formulation F that the viscosity of the formulation is raised slightly, for example up to 20 to 40 cP. This does not disrupt pumping of the formulation into the deposit. The thickener reduces the volume of formulation required, since the viscous formulation penetrates predominantly into the high-permeability regions/channels (3) and is effectively "deposited" there. The thickening of the injected formulation also significantly reduces the dilution thereof in the geological layer, since the miscibility of the media with different viscosity is less than for media with the same viscosity, and the stratum water from the high-permeability zones is displaced by the viscous mass.

The above-described preferred formulations F comprising at least one compound M selected from metal compounds and semimetal compounds which can form gels when admixed with bases, and at least one water-soluble activator, have the advantage that inorganic gels are formed. These gels form at approx. 70° C. and are stable up to temperatures of 300° C., and are therefore particularly suitable for deposits with very high temperatures, for example deposits at the end of steam flooding. In addition, the inorganic gels can, if required, also be removed very readily from the formation, by injecting acid into the formation and dissolving the gels.

The critical temperature $T_K$ of the above-described preferred formulations F comprising at least one compound M selected from metal compounds and semimetal compounds which can form gels when admixed with bases, and at least one water-soluble activator, is the gel formation temperature of the particular inorganic component. In these formulations, $T_K$ is 60 to 70° C. These formulations are therefore of good suitability for use after completion of water flooding and before commencement of steam flooding.

Process step (1) can be performed directly before commencement of steam flooding (process step (2)), but it can also be performed a certain time before commencement of process step (2). For example, the aqueous formulations F used with preference, comprising at least one compound M selected from metal compounds and semimetal compounds which can form gels when admixed with base, and at least one water-soluble activator which brings about an increase in the pH of the aqueous formulation at a temperature of at least $T_K$, are what are called true solutions and may be present for months in the deposit without losing activity. This means that, even after storage for months in the deposit, they exhibit an increase in viscosity in the event of an increase to a temperature of at least $T_K$.

In process step (1), at least one aqueous formulation F is injected into at least one injection well. However, it is also possible to inject more than one aqueous formulation F; for example, it is possible to successively inject portions of two or more different aqueous formulations. The first formulation injected may, for example, be an inexpensive solution of an organic thermogel based on cellulose ethers. The formulation forms a gel at temperatures of 70 to 80° C. and remains stable underground up to temperatures of 180 to 200° C. The second formulation used may be one of the above-described aqueous formulations F which comprises at least one compound selected from metals and semimetals and at least one water-soluble activator (especially urea). These formulations are active at temperatures of 60 to 70° C. and remain stable underground up to temperatures of 280 to 300° C.

If the distance between the at least one injection well and the at least one production well is relatively high, in order to reduce the costs, it is possible for only one third or half of the total length of the channels present between the injection well and the production well to be filled with the aqueous formulation. In most cases, this is sufficient to conduct efficient profile modification.

The amount of formulation F is determined after geological analysis of the deposit section. In most cases, the amount of formulation F is defined by calculating the limit of economic viability of the measures. If the water breakthroughs are determined predominantly by the geological faults and the distance between injection well and production wells is small, the requirement for aqueous formulation F is relatively low. Since geophysical studies can discover only some of the faults, the calculations of the volume of formulation F needed are very uncertain. The best method in this case is the identification of the output of the formulation F in the adjacent wells by chemical analysis of the wet oil. The pumping of formulation F is stopped after the identification of the formulation F in the adjacent wells. The estimated amount of formulation F for the abovementioned deposit is approx. 100 to 200 m$^3$ per meter of thickness of the oil-bearing stratum.

When the high-permeability regions in the mineral oil deposit are in the form, for example, of strata (the permeability of the matrix is not homogeneous), the requirement for aqueous formulation F is much greater. In this case, only some of the high-permeability zones are saturated with formulation F. The economic factors come into play here. For efficient performance of the process, the volume of the injected formulation F (estimate) should be at least 10% of the estimated pore volume (based on the high-permeability regions/layers) in the mineral oil deposit between injection well and production well, preferably at least 20%, more preferably at least 30%.

The same purpose is served by a variant of the present process in which the injection of the aqueous formulation is followed directly by subsequent flooding with water. The subsequent flooding with water shifts the front comprising the aqueous formulation in the direction of the middle of the high-permeability regions. In the course of steam flooding, the high-viscosity region then forms in the middle region of the high-permeability channels. This variant of the process according to the invention is shown schematically in FIG. 3a.

While the aqueous formulation F is injected into at least one injection well, mineral oil can be withdrawn from at least one production well. In a preferred embodiment, mineral oil is withdrawn from the at least one production well during process step (1), and process step (2) is commenced as soon as aqueous formulation F injected through the at least one injection well is detected in the mineral oil withdrawn.

In a further variant of the present process, mineral oil is withdrawn from at least one production well during process step (1), and no mineral oil is withdrawn from this production well for a period as soon as aqueous formulation F injected through the at least one injection well is detected in the mineral oil withdrawn. Preference is given to not withdrawing any mineral oil until process step (2) is commenced.

Process Step (2)

After process step (1), at least a portion of the aqueous solution injected is heated in process step (2) directly (variant 1) and/or indirectly (variant 2) by injection of steam into the mineral oil deposit. The steam used preferably has a temperature of 200 to 350° C. The injection of steam into an injection well is known to those skilled in the art, as is the equipment suitable therefor. This step is also known by the term "steam flooding". Steam flooding can be performed with the conventional technology known to those skilled in the art.

Variant 1

In the case of direct heating, the steam is injected directly into the mineral oil-bearing stratum L, into which the aqueous formulation F has been injected in step (1) (variant 1). In a preferred embodiment, steam is injected for this purpose through the at least one injection well into the at least one oil-bearing stratum.

The steam is converted relatively rapidly to steam condensate in the deposit. The region in which the condensation takes place is typically within a radius from 5 to 40 m from the injection well. The hot steam/steam condensate attempts to flow to the production well through the high-permeability channels which were created at the earlier stage of water flooding or already existed beforehand. These channels, however, have been filled with the aqueous formulation F in process step (1). The formulation is shifted by the steam/steam condensate in the direction of the production well. Under the action of the hot steam/steam condensate, the temperature in the oil-bearing stratum L and in the deposit rises. The aqueous formulation is likewise heated until, on attainment of the critical temperature $T_K$, the viscosity of the formulation F rises significantly, for example as a result of formation of a high-viscosity gel. The longer the oil-bearing stratum L is flooded with the steam, the greater will be the volume in the oil-bearing stratum L which has been filled with the formulation F and in which the viscosity increase has taken place. The high-permeability channels are thus "blocked". The further injected hot steam and the hot steam condensate which forms then flow into the regions from which oil had not been recovered in the preceding mineral oil production, for example in the course of water flooding.

A schematic illustration of the temperature profile (5) and of a vertical section through a mineral oil-bearing stratum in a deposit after commencement of steam flooding is shown in FIG. 1. In the region of the high-permeability channels (3) in which the temperature $T_L$ of the mineral oil-bearing stratum is above the critical temperature $T_K$ of the formulation, a viscosity increase has taken place, for example as a result of formation of a gel; see region (6). FIG. 2 shows a horizontal section through the mineral oil-bearing stratum L in the mineral oil deposit, in which the distribution of the region (6) in which the viscosity has increased, of the high-permeability channels (3), and the injection well (1) and several production wells (2) are shown.

Another option in this variant is, after heating the deposit zones saturated with formulation to the critical temperature $T_K$, to switch from steam flooding back to water flooding. In the case of this option, steam flooding is used only to conduct the increase in viscosity of the formulation. This option can be used especially in development of deposits with oil viscosity from approx. 20 to 50 cP.

A further option in this variant is to inject heat carrier (steam/steam condensate) and formulation F simultaneously into at least two different wells. In the case of this option, heat carrier and formulation F move toward one another in the deposit.

Variant 2

In the case of indirect heating of at least a portion of the injected aqueous formulation F, the steam is injected into at least one further stratum B which is in thermal contact with the mineral oil-bearing stratum L. Stratum B is preferably likewise a mineral oil-bearing stratum which may comprise the same type or quality of mineral oil as stratum L, but also mineral oil of other types or qualities. "In thermal contact" in the present context means, in relation to strata L and B, that heat can be transferred between them. At the same time, they are sufficiently close to one another that, on injection of steam into stratum B, an amount of heat is transferred to stratum L which is sufficient to heat at least a portion of the aqueous formulation F injected into stratum L to at least $T_K$.

Process variant 2 is preferably employed in an oil deposit which comprises at least two oil-bearing strata in thermal contact with one another. In such a case, the oil-bearing strata often have different properties. This relates, for example, to permeability, porosity and oil viscosity, stratum pressure. Due to these different properties, simultaneous recovery of oil from several strata is often complicated or impossible.

FIG. 4 shows a schematic of such a deposit with two oil-bearing strata. Stratum 7 has a relatively high permeability and is saturated with oil which can be produced by water flooding. This stratum (7) is the first to be developed by flooding it with water. Since the permeability of stratum (7) is inhomogeneous, water breakthroughs are registered in the production wells (2) after a certain time. Due to the rapid rise in watering out of production, the decision is taken to stop production from stratum (7) for a certain time. Before oil production from stratum (7) is stopped, this stratum is flooded with aqueous formulation F. As a result, the high-permeability channels which enable the water breakthroughs in stratum (7) are filled with the formulation F. The critical temperature $T_K$ of the aqueous formulation F is above the temperature $T_L$ of stratum (7).

Thereafter, the lower oil-bearing stratum (8) is developed by steam flooding. In this stratum is viscous oil which can be produced efficiently from this stratum only by steam flooding. In the course of steam flooding of stratum (8), not only is stratum (8) heated, but also the non-oil-bearing intermediate stratum (9) and the adjoining stratum (7). When the temperature in stratum (7) rises up to temperature $T_K$, the increase in viscosity of formulation F commences, and the high-permeability zones are partly or completely filled with viscous formulation. After the increase in viscosity is complete, water flooding of stratum 7 continues.

The intermediate stratum (9) may be 1 to 5 meters in thickness. In the case of injection of 300 to 600 tonnes of steam per day at a temperature of approx. 300° C., the temperature of stratum (7) reaches the temperature $T_K$ within a couple of months. In order to accelerate the increase in viscosity, an aqueous formulation F with low critical temperature can be used to reduce the difference between temperature $T_K$ and temperature $T_L$ of stratum 7.

The aqueous formulations F used may be inorganic and organic compositions whose temperature $T_K$ can be regulated. For example, the known inorganic mixtures based on urea, aluminum salt and urotropin, or the organic mixtures based on methylcellulose and urea, are useful.

Variant 2 can be performed according to the following schemes:

Scheme 1: water flooding of stratum L→subsequent flooding of stratum L with aqueous formulation F (after an increase in watering out of production)→adjustment of flooding of stratum L and subsequent steam flooding of adjacent stratum B→recommencement of water flooding of stratum L after the temperature of this stratum has increased to at least $T_K$.

Scheme 2: water flooding of stratum L→subsequent flooding of stratum L (after watering out of production has increased) with aqueous formulation F and simultaneous steam flooding of adjacent stratum B→recommencement of water flooding of stratum L after the temperature of this stratum has increased to at least $T_K$.

According to scheme 2, the filling of the high-permeability zones with aqueous formulation F is performed simultaneously with steam flooding of the adjacent stratum. Since the thermal transfer from the steam-flooded stratum to the water-flooded stratum is slow, scheme 2 is easy to implement.

Scheme 3 (FIG. 5): water flooding of stratum L→subsequent flooding of stratum L (after watering out of production has increased) with aqueous formulation F and simultaneous or non-simultaneous steam flooding of adjacent stratum B through another well→recommencement of water flooding of stratum L after the temperature of this stratum has increased to at least $T_K$.

When the difference between $T_L$ (temperature of stratum 3) and $T_K$ is relatively large, the temperature rise of layer 3 is controlled/measured during the steam flooding of stratum 8 (FIGS. 4, 5), and the pumping of formulation F into stratum 3 is not commenced until there is a temperature difference $(T_K-T_L)$ of 1 to 5° C.

After the flooding of stratum 7 has been stopped, the movement of the injected liquids (aqueous formulation F and any water used for subsequent flooding) is minimal and the "washout" of the aqueous formulation F is ruled out. The aqueous formulation F is stored in the solid rock. The properties of the aqueous formulation F are preserved unchanged for several months. The aforementioned inorganic formulations are what are called true solutions and do not have a tendency to form sediments or to flocculate.

In a further embodiment, steam is injected before process step (3) into those production wells where aqueous formulation F injected through the at least one injection well is detected in the mineral oil withdrawn therefrom. In this way, in the region close to the particular production well, a profile modification is likewise performed and the high-permeability channels are closed. This embodiment of the process according to the invention is shown schematically in FIG. 3b. The steam injected into the production wells preferably has a temperature of 200 to 350° C. This measure can be performed by the process according to the invention either by variant (1) or by variant (2).

Step (2) of the process according to the invention is performed until at least a portion of the aqueous formulation F injected has been heated to at least $T_K$, such that an increase in viscosity, for example as a result of gel formation, has taken place in at least some of the injected formulation F, and the high-permeability channels are blocked as a result at least to such an extent that, on continuation of mineral oil production, there is a rise in the amount of mineral oil produced or a reduction in watering out of production. According to the embodiment, this may last for a shorter or longer period. If step (2) is performed, for example, according to variant (1), which means that steam is injected directly into the mineral oil-bearing stratum L, the viscosity increase is usually much more rapid in the area close to the well (radius 3-5 meters), for example occurs within a few days, for example within 1 to 3 days. If step (2) is performed according to variant (2), more time is typically required until the temperature $T_K$ required for the viscosity increase has been attained. According to the distance between the strata L and B in question, this may also take a few months, for example 4 to 6 months. This is not a problem particularly when true solutions such as the above-described aqueous formulations F comprising at least one compound M and at least one water-soluble activator are used in step (1), since these formulations, being true solutions, are stable against flocculation and sedimentation, and do not lose their characteristic of exhibiting an increase in viscosity when heated to at least $T_K$ even after a few months of storage in the deposit.

In principle, step (2), in accordance with the invention, can be performed according to variant (1) or variant (2); it is also possible to conduct the respective measures of the two variants simultaneously or in succession, which means that steam can be injected in step (2) both into the mineral oil-bearing stratum L and into one or more further strata B which may be present. This can be effected simultaneously or in alternating succession.

Injection of the at least one aqueous formulation F may optionally be followed by subsequent flooding with water, for example in order to shift the aqueous formulation deeper into the mineral oil-bearing stratum L.

Process Step (3)

In process step (3), the production of mineral oil is continued through at least one production well. The oil can be produced by customary methods, by injecting a flooding medium through at least one injection well into the mineral oil deposit and withdrawing crude oil through at least one production well. The flooding medium may especially be carbon dioxide, gas-water mixture, water, thickened water and/or steam. The at least one injection well may be the injection wells already used for injection of formulation F in process step (1) and of the steam in process step (2), or else other injection wells in suitable arrangement.

The oil can, however, of course also be produced by means of other methods known to those skilled in the art. For example, the flooding media used may also be viscous solutions of silicate-containing products or thickening polymers. These may be synthetic polymers, for example polyacrylamide or acrylamide-comprising copolymers. In addition, they may also be biopolymers, for example particular polysaccharides.

The present invention is described hereinafter with reference to examples.

Employment of the Process in an Oil Field

One example of a possible method of conduction is described hereinafter.

The deposit is a typical mineral oil deposit containing viscous oil (150 to 190 cP before commencement of mineral oil production). A section of the deposit is provided with one injection well and several production wells and has already been flooded with water for several years. The natural deposit temperature is 37° C. According to estimates, the deposit temperature after the water flooding has fallen to 20 to 25° C. (at least in the zones which have been "washed through" efficiently). The vertical and horizontal permeability have marked anisotropy. The deposit has numerous geological faults. Most of the geological faults are water-bearing. In the water-flooded deposit section, the level of oil recovery is 20%. Watering out of production has reached 94%, which means that 94% of the liquid produced is water. The communication, i.e. the flow of the injected flooding medium between injection wells and production wells, takes place predominantly via the geological faults, and an oil-bearing stratum with extremely high permeability and low thickness.

A decision is made to continue treatment of the deposit by steam flooding.

In a mathematical simulation, it is found that the volume of the high-permeability regions in a radius of 50 m from the injection well is approx. 12000 m$^3$ (hypothetical pore volume/empty space). Blockage of the high-permeability regions/channels in a radius of 50 m around the injection well is sufficient to conduct effective profile modification for the subsequent steam flooding.

Directly before commencement of the steam flooding, about 3000 m$^3$ of aqueous formulation of the following composition are injected into the deposit through the injection well:

| | |
|---|---|
| 30% by weight of | urea, |
| 18% by weight of | aluminum hydroxychloride, |
| 0.5% by weight of | polyacrylamide and |
| 51.5% by weight of | water. |

The concentration figures are based on the total weight of the formulation.

In the course of injection and flooding of the formulation in the deposit, it is diluted by the water present in the deposit by about four times in a radius of 50 m around the injection well; the potential gel volume is thus about 12000 m$^3$. In the course of dilution of the formulation with water and the subsequent gel formation of the formulation in the course of steam flooding, the gel maintains the desired rheological properties. Only in the case of dilution by about eight times does the formulation lose the desired rheological properties and hence its ability to modify the profile. Thereafter, 500 m$^3$ of water are injected. The polyacrylamide serves to thicken the formulation F. As a result of addition of polyacrylamide, the viscosity of the formation (before gelation) reaches 10-40 cP. The low-viscosity mass flows predominantly through the faults and through the high-permeability thin layer.

Subsequently, flooding with hot steam is commenced. The steam temperature is 280 to 320° C. By virtue of its high mobility, the steam spreads relatively rapidly in the deposit and condenses with release of heat of condensation. The temperature in the zone close to the injection well exceeds the critical temperature $T_K$ after about 3 to 5 days. $T_K$ in this case is the gel formation temperature of the aqueous formulation injected, which is 60 to 70° C. The aqueous formulation injected is converted to the gel. Even though the rock in the deposit is yet to attain the critical temperature $T_K$, the hot steam condensate mixes with the aqueous formulation, as a result of which the temperature of the formulation rises and a gel forms, which partly or fully blocks the pores and cracks in the rock. The viscosity of the gel which forms reaches 500 to 1500 cP. As a result, the steam and the hot steam condensate are diverted into the zones of the deposit from which oil has been recovered only to a minor degree in the course of water flooding. As steam flooding continues, the temperature front migrates from the injection well in the direction of the production well. At the same time, the gel volume in the deposit grows. The consequence is a rise in the oil production rates and the level of oil recovery from the deposit, and a fall in watering out of production.

The invention claimed is:

1. A process for producing mineral oil from an underground mineral oil deposit comprising at least one oil-bearing stratum L into which at least one injection well and at least one production well have been sunk, comprising the following process steps:
   (1) injecting at least one aqueous formulation F which exhibits an increase in viscosity at or above a critical temperature $T_K$ through the at least one injection well into the at least one oil-bearing stratum L, the critical temperature $T_K$ being above the temperature $T_L$ of the at least one oil-bearing stratum L,
   (2) after step (1), directly or indirectly heating at least a portion of the aqueous formulation F injected in step (1) by injecting steam into the mineral oil deposit,
   (3) producing mineral oil through at least one production well,
   wherein the temperature of the aqueous formulation F on injection in step (1) is below the critical temperature $T_K$, and step (2) is conducted at least until at least a portion of the aqueous formulation F injected in step (1) has been heated to a temperature of at least $T_K$;
   wherein mineral oil is withdrawn from the at least one production well during step (1), and step (2) is commenced as soon as aqueous formulation F injected through the at least one injection well is detected in the mineral oil withdrawn.

2. The process according to claim 1, wherein direct heating is effected in step (2) by injecting the steam through the at least one injection well into the at least one oil-bearing stratum L.

3. The process according to claim 1, wherein indirect heating is effected in step (2) by injecting the steam into at least one stratum B in the mineral oil deposit which is in thermal contact with the at least one oil-bearing stratum L.

4. The process according to claim 3, wherein stratum B is a mineral oil-bearing stratum.

5. The process according to claim 1, wherein the temperature $T_L$ is determined before step (1).

6. The process according to claim 1, wherein the temperature $T_L$ in step (1) is 8 to 60° C.

7. The process according to claim 1, wherein the temperature of the steam injected in step (2) is 200 to 350° C.

8. The process according to claim 1, wherein the viscosity of the mineral oil present in the at least one oil-bearing stratum L is at least 30 cP, measured at the temperature $T_L$.

9. The process according to claim 1, wherein the at least one aqueous formulation F when heated to the temperature $T_K$ or higher forms a gel.

10. The process according to claim 9, wherein the at least one aqueous formulation F comprises at least one compound selected from the group consisting of aluminum chloride, aluminum nitrate, aluminum acetate, aluminum acetylacetonate, aluminum sulfate, partial hydrolysates thereof, and mixtures thereof, and at least one water-soluble activator selected from the group consisting of urea, substituted urea, hexamethylenetetramine, cyanates and mixtures thereof.

11. The process according to claim 1, wherein the at least one aqueous formulation F comprises thickeners.

12. The process according to claim 1, wherein mineral oil is withdrawn from at least one production well during step (1), and no mineral oil is withdrawn from the at least one production well for a period as soon as aqueous formulation F injected through the at least one injection well is detected in the mineral oil withdrawn.

13. The process according to claim 1, wherein steam is injected before step (3) into the at least one production well where aqueous formulation F injected through the at least one injection well is detected in the mineral oil withdrawn therefrom.

14. The process according to claim 12, wherein steam is injected before step (3) into the at least one production well where aqueous formulation F injected through the at least one injection well is detected in the mineral oil withdrawn therefrom.

15. The process according to claim 13, wherein the steam injected has a temperature of 200 to 350° C.

16. The process according to claim 14, wherein the steam injected has a temperature of 200 to 350° C.

17. The process according to claim 1, wherein in step (2) at least a portion of the aqueous formulation F injected in step (1) is directly and indirectly heated by injecting steam into the mineral oil deposit.

18. The process according to claim 1, wherein the temperature $T_L$ of the at least one oil-bearing stratum L in step (1) is from 8 to 50° C.

19. The process according to claim 1, wherein the at least one aqueous formulation F does not form a gel below the temperature $T_K$.

* * * * *